United States Patent
Keene et al.

(10) Patent No.: US 10,431,067 B2
(45) Date of Patent: Oct. 1, 2019

(54) APPARATUS FOR DETECTING FERROMAGNETIC OBJECTS AT A PROTECTED DOORWAY ASSEMBLY

(71) Applicant: Metrasens Limited, Malvern (GB)

(72) Inventors: Mark Nicholas Keene, Malvern (GB); Thomas John Horton, Malvern (GB)

(73) Assignee: Metrasens Limited, Malvern (GB)

( * ) Notice: Subject to any disclaimer, the term of this patent is extended or adjusted under 35 U.S.C. 154(b) by 65 days.

(21) Appl. No.: 14/438,354

(22) PCT Filed: Oct. 21, 2013

(86) PCT No.: PCT/GB2013/052741
§ 371 (c)(1),
(2) Date: Apr. 24, 2015

(87) PCT Pub. No.: WO2014/064429
PCT Pub. Date: May 1, 2014

(65) Prior Publication Data
US 2015/0279189 A1 Oct. 1, 2015

(30) Foreign Application Priority Data
Oct. 24, 2012 (GB) .................................. 1219097.1

(51) Int. Cl.
*G08B 21/00* (2006.01)
*G08B 21/18* (2006.01)
(Continued)

(52) U.S. Cl.
CPC ............... *G08B 21/18* (2013.01); *G01V 3/08* (2013.01); *G01V 11/00* (2013.01); *G01V 11/002* (2013.01)

(58) Field of Classification Search
CPC ............ G08B 13/2408; G08B 13/2442; G08B 13/2437; A61B 5/746
(Continued)

(56) References Cited

U.S. PATENT DOCUMENTS 3,573,817 A 4/1971 Akers
3,697,972 A 10/1972 Brown
(Continued)

FOREIGN PATENT DOCUMENTS

CN 2172891 Y 7/1994
CN 101383071 A 3/2009
(Continued)

OTHER PUBLICATIONS

International Preliminary Report on Patentability and Written Opinion of the International Searching Authority dated Apr. 28, 2015, issued in corresponding International Application No. PCT/GB2013/052741, filed Oct. 21, 2013, 10 pages.
(Continued)

*Primary Examiner* — Joseph H Feild
*Assistant Examiner* — Sharmin Akhter
(74) *Attorney, Agent, or Firm* — Christensen O'Connor Johnson Kindness PLLC

(57) ABSTRACT

An apparatus for protecting an entrance to a protected area comprises a magnetic sensor to measure an ambient magnetic field or gradient within a first zone of sensitivity at a non-magnetic sensor means adapted to detect the presence of objects within a primary detection zone, a signal processing circuit arranged in communication with the magnetic sensor apparatus and non-magnetic sensor apparatus, and a warning device operable by an output signal from the signal processing circuit, the warning device adapted to provide an alarm. The signal processing circuit identifies temporal variations due to the movement of a ferromagnetic object
(Continued)

within the ambient magnetic field and correlates them with instances in which the non-magnetic sensor means detects the presence of an object in its detection zone, and causes the alarm to operate in the event that the correlation is indicative of the presence of a ferromagnetic object in the primary detection zone. It also determines the direction from which an object is approaching the using signals from the non-magnetic sensor means and modifies the operation of the warning device dependent on the direction.

19 Claims, 11 Drawing Sheets

(51) Int. Cl.
    *G01V 11/00*     (2006.01)
    *G01V 3/08*     (2006.01)

(58) Field of Classification Search
    USPC .................................. 340/551, 572.6, 573.1
    See application file for complete search history.

(56) References Cited

U.S. PATENT DOCUMENTS

| | | |
|---|---|---|
| 3,758,849 A | 9/1973 | Susman et al. |
| 3,763,424 A | 10/1973 | Bennett, Jr. et al. |
| 3,971,983 A | 7/1976 | Jaquet |
| 4,024,468 A | 5/1977 | Hirschi |
| 4,068,164 A | 1/1978 | Schwartz et al. |
| 4,087,814 A * | 5/1978 | Spirig ..................... G01S 13/56 340/554 |
| 4,249,128 A | 2/1981 | Karbowski |
| 4,334,191 A | 6/1982 | Podhrasky |
| 4,413,232 A | 11/1983 | Most et al. |
| 4,467,251 A | 8/1984 | Jönsson |
| 4,472,908 A | 9/1984 | Wanzl et al. |
| 4,488,115 A | 12/1984 | Podhrasky |
| 4,698,937 A | 10/1987 | Kombrekke et al. |
| 4,942,360 A | 7/1990 | Candy |
| 4,962,473 A | 10/1990 | Crain |
| 5,039,981 A | 8/1991 | Rodriguez |
| 5,148,151 A | 9/1992 | Podhrasky |
| 5,345,222 A | 9/1994 | Davies et al. |
| 5,414,410 A | 5/1995 | Davies et al. |
| 5,456,718 A | 10/1995 | Szymaitis |
| 5,959,451 A | 9/1999 | De Torfino |
| 5,996,281 A | 12/1999 | Takano et al. |
| 6,133,829 A | 10/2000 | Johnstone et al. |
| 6,150,810 A | 11/2000 | Roybal |
| 6,308,644 B1 | 10/2001 | Diaz |
| 6,342,835 B1 | 1/2002 | Nelson-White |
| 6,541,966 B1 | 4/2003 | Keene |
| 6,696,947 B1 | 2/2004 | Bybee |
| 7,113,092 B2 | 9/2006 | Keene |
| 7,296,683 B1 | 11/2007 | Vallelonga, Sr. et al. |
| 7,414,404 B2 | 8/2008 | Keene |
| 7,525,308 B2 | 4/2009 | Tsukada et al. |
| 7,893,690 B2 | 2/2011 | Simon |
| 8,450,678 B2 | 5/2013 | Sasaki et al. |
| 2002/0148965 A1 | 10/2002 | Haufe |
| 2003/0080868 A1 | 5/2003 | Nelson |
| 2003/0171669 A1 | 9/2003 | Kopp |
| 2004/0041084 A1 | 3/2004 | Carlson |
| 2004/0080315 A1 | 4/2004 | Beevor et al. |
| 2004/0135687 A1 * | 7/2004 | Keene .................... G01V 11/00 340/551 |
| 2004/0147833 A1 | 7/2004 | Czipott et al. |
| 2005/0119547 A1 | 6/2005 | Shastri et al. |
| 2005/0242817 A1 | 11/2005 | Hoult |
| 2005/0264416 A1 * | 12/2005 | Maurer .................. G06Q 10/08 340/539.13 |
| 2006/0145691 A1 | 7/2006 | Massengill et al. |
| 2006/0158331 A1 | 7/2006 | Massengill et al. |
| 2006/0197523 A1 | 9/2006 | Palecki et al. |
| 2007/0040692 A1 | 2/2007 | Smith et al. |
| 2007/0052411 A1 | 3/2007 | McClure et al. |
| 2007/0057786 A1 | 3/2007 | McClure et al. |
| 2007/0132581 A1 | 6/2007 | Molyneaux et al. |
| 2007/0133844 A1 | 6/2007 | Waehner et al. |
| 2007/0182550 A1 | 8/2007 | Castello et al. |
| 2007/0290843 A1 | 12/2007 | Manneschi |
| 2007/0296576 A1 | 12/2007 | Holowick |
| 2008/0001735 A1 | 1/2008 | Tran |
| 2008/0080178 A1 | 4/2008 | Kita et al. |
| 2008/0084301 A1 | 4/2008 | Roybal et al. |
| 2008/0117044 A1 | 5/2008 | Hibbs |
| 2008/0136631 A1 | 6/2008 | Fluck |
| 2008/0157965 A1 * | 7/2008 | Shahar ..................... G01V 8/20 340/556 |
| 2008/0231443 A1 | 9/2008 | Kotter et al. |
| 2009/0122547 A1 | 5/2009 | Hou |
| 2009/0167307 A1 | 7/2009 | Kopp |
| 2009/0266887 A1 | 10/2009 | Molyneaux et al. |
| 2009/0273340 A1 | 11/2009 | Stephanson et al. |
| 2009/0284405 A1 | 11/2009 | Salmon et al. |
| 2010/0013461 A1 | 1/2010 | Masubuchi et al. |
| 2010/0026510 A1 * | 2/2010 | Kiani ................... A61B 5/1455 340/691.3 |
| 2010/0156407 A1 | 6/2010 | Lausch et al. |
| 2010/0156638 A1 | 6/2010 | McClure et al. |
| 2010/0315080 A1 | 12/2010 | Duncan et al. |
| 2010/0319256 A1 | 12/2010 | Agam et al. |
| 2011/0057788 A1 | 3/2011 | Talkington et al. |
| 2011/0102597 A1 | 5/2011 | Daly et al. |
| 2011/0172953 A1 * | 7/2011 | Kim .................. H05B 37/0227 702/150 |
| 2011/0285390 A1 | 11/2011 | Jewitt et al. |
| 2012/0038456 A1 | 2/2012 | Pikkarainen et al. |
| 2012/0074943 A1 | 3/2012 | MacLeod et al. |
| 2013/0187788 A1 | 7/2013 | Salter |
| 2013/0229518 A1 | 9/2013 | Reed et al. |
| 2013/0307533 A1 | 11/2013 | Keene et al. |
| 2014/0232382 A1 | 8/2014 | Goodyear et al. |
| 2014/0248833 A1 | 9/2014 | Royle et al. |

FOREIGN PATENT DOCUMENTS

| | | |
|---|---|---|
| CN | 101681542 A | 3/2010 |
| CN | 201955884 U | 8/2011 |
| CN | 102682553 A | 9/2012 |
| EP | 0 097 139 A2 | 12/1983 |
| GB | 2 395 276 A | 5/2004 |
| JP | 2008-249584 A | 10/2008 |
| WO | 03/069320 A2 | 8/2003 |
| WO | 2008/028487 A1 | 3/2008 |
| WO | 2011/086369 A1 | 7/2011 |
| WO | 2012/022971 A2 | 2/2012 |
| WO | 2014/064429 A2 | 5/2014 |

OTHER PUBLICATIONS

Search Report Under Section 17 dated Feb. 20, 2013, issued in corresponding British Application No. 1219097.1, filed Oct. 24, 2012, 1 page.

International Search Report dated Sep. 10, 2014, issued in corresponding International Application No. PCT/GB2013/052741, filed Oct. 21, 2013, 5 pages.

European Office Action dated Jan. 3, 2019 for European Application No. 13792940.2, 10 pages.

First Chinese Office Action and English Translation dated Apr. 2, 2019 for Chinese Application No. 201810079543.5, 18 pages.

Chinese Notice of Opposition dated Apr. 2, 2019 for Chinese Application No. 201380067644.6, 41 pages.

* cited by examiner

APPARATUS FOR DETECTING FERROMAGNETIC OBJECTS AT A PROTECTED DOORWAY ASSEMBLY

This invention relates to apparatus for use in protecting a doorway assembly, a protected doorway and a method of protecting a doorway. It is especially, but not exclusively concerned with the reduction of false, or unwanted, alarms associated traditionally with such apparatus.

The present invention relates to apparatus for detecting the presence of ferromagnetic objects and to a protected doorway assembly for a room which include an apparatus for detecting ferromagnetic objects and in particular to a device for detecting the presence of ferromagnetic objects in the vicinity of the doorway of a room containing a magnetic resonance imagining (MRI) scanner.

In GB 2 395 276 there is taught an apparatus which is able to detect ferromagnetic objects by providing a primary sensor means comprising first and second passive magnetic sensors which detect the disturbances in the ambient magnetic field which occur as the object moves through the field. The apparatus also includes a secondary non-magnetic sensor means which detects movement of objects in the vicinity of the primary sensor means. If both the primary and secondary sensing means detect a moving object an alarm is triggered. It is proposed in that patent that the apparatus may be mounted to the wall on either side of a doorway to a room containing a magnetic resonance imaging apparatus, with the secondary sensor means being arranged to detect objects approaching or about to pass through the doorway. Because both the primary and secondary sensors must detect the object this arrangement helps to reduce false alarms.

The apparatus described above works very well to warn people who may be unintentionally about to take a ferromagnetic object into an MRI room. It is known that there have in the past been several unfortunate accidents which have occurred due to a ferrous object entering an MRI room and being magnetically propelled, at high velocity, into the MRI machine within the room. This is called the projectile effect, and is well described in GB 2 395 276.

Recently there is a trend towards providing doors within the doorway of an MRI room which open outwards, i.e. out of the room. This means that the door will pass through the zone of sensitivity of an apparatus which is located on the wall outside of the room.

There are two issues that might give rise to a problem with a system that monitors the doorway for ferromagnetic objects. Firstly, the door will often carry ferromagnetic items, such as door handles or lock parts, and as the door and items move through the zone the alarm may be triggered giving a false alarm due to Eddy currents being formed within the door handles or lock parts or the door itself. Secondly, where the secondary sensor means comprises a light beam the door will move to block the light beam and then any ferromagnetic object within the range of the primary sensor means but not about to pass through the door will trigger a false alarm.

It has been proposed to solve this problem by placing a detection apparatus on the inside of the MRI room when an outward opening door is provided. This ensures the door does not pass through the zone of sensitivity of the secondary sensors of the apparatus. However, the applicant believes this is not a good solution. MRI rooms are subject to high levels of magnetic radiation from the MRI device, which could cause interference with the apparatus. For this reason many people do not like having any active part of the system on the inside of the room. Similarly, MRI devices are sensitive to external radiation and so the apparatus may need to be shielded to prevent it from interfering with the MRI device. It has been proposed to switch off the apparatus whenever the door is closed to ameliorate this problem but this introduces further complexity and a further source of unreliability. Placing the sensors inside the zone being protected also means that the alarm will only go off after an unsafe object has already entered the protected zone.

Alternatively, the problem can be solved by placing the apparatus sufficiently far in front of the doorway on the outside of the room for the door not to enter the zone of sensitivity. However, this will cause the apparatus to take up a lot of space, and barriers may then be needed between the apparatus and the doorway to prevent people entering the room without passing through the zone of sensitivity. In the case of a doorway in the sidewall of a corridor it may be impractical to install the apparatus in such a manner as it would block the corridor.

A still further alternative solution is taught in WO 2012/022971, in which a pair of light beams are used that are arranged relative to the door such that with the door open both of the beams can be broken as a person passes through the doorway, setting off an alarm, yet at no time during opening of the door will the door itself cause both beams to be broken. This ensures that opening of the door does not trigger the alarm. Apart from the two beams being present the system can function in much the same way as that taught in GB 2 395 276 but with a door that opens outwards.

With all of the systems described above, and indeed all other commercially available systems known to the applicant, there are occasions where false alarms can occur, or correct but unhelpful alarms might occur.

A first situation in which a false alarm can arise is when the system is triggered by the movement of a door which contains ferromagnetic material. The doors to an MRI room, for instance, are often solid metal doors to provide shielding that prevents radiation entering or radiation escaping from the room through the door. As the metal moves through the magnetic field powerful eddy currents can be generated in the door which are detected by the system. Then, as a person or object passes through the door a false alarm is triggered as the system perceives the person or object to be ferromagnetic when it is actually the door.

Another situation which is considered by some operators to be undesirable is the generation of an alarm when a person who is carrying or wearing a ferromagnetic item, or perhaps pushing a ferromagnetic object intentionally into the room. This is not a false alarm as such, merely an undesirable one. A typical scenario would be a trained operative entering the room whilst wearing an underwired bra which has become magnetised. This will trigger an alarm even though it is a safe situation and the operative is experienced and may be trusted enough to make the decision that the alarm can be disregarded.

Unwanted alarms will also be issued when a person or object is leaving the room and is detected by the system. For instance, an operative moving a ferromagnetic object out of an MRI room will cause an alarm to be issued despite their being no associated risk.

Unwanted alarms may lead to irritation of the operatives, and could lead to them paying less attention to genuine useful alarms.

An object of the present invention in at least one of its aspects is to ameliorate some of the problems described hereinbefore.

According to a first aspect the invention provides apparatus for protecting an entrance to a protected area, the apparatus comprising:

a magnetic sensor apparatus adapted to measure an ambient magnetic field or gradient within a localised volume of space defined by a first zone of sensitivity of the at least one magnetic sensor, and to produce a corresponding measurement signal, a non-magnetic sensor means adapted to detect the presence of objects within a primary detection zone in the vicinity of the magnetic sensor means, a signal processing circuit arranged in communication with the magnetic sensor apparatus and non-magnetic sensor apparatus, and a warning device operable by an output signal from the signal processing circuit, the warning device adapted to provide within the vicinity of apparatus at least one of an audible alarm and a visible alarm, and further in which:

the signal processing circuit is configured to identify temporal variations in the measurement signal due to the movement of a ferromagnetic object within the ambient magnetic field and to correlate the identified temporal variations in the measurement signal with instances in which the non-magnetic sensor means detects the presence of an object in its detection zone, and in which the signal processing circuit is arranged to cause the warning device to operate in the event that the correlation is indicative of the presence of a ferromagnetic object in the primary detection zone, and further in which the signal processing circuit is adapted to determine the direction from which an object is approaching the doorway from the output signals from the non-magnetic sensor means and to modify the operation of the alarm dependent on the direction of approach.

The non-magnetic sensor means may comprise a first non-magnetic sensor adapted to detect the presence of objects within a primary detection zone and a second non-magnetic sensor adapted to detect the presence of objects within a second detection zone, which may only partially overlap the primary detection zone or may not overlap any of the primary detection zone. The first and second sensors may be discrete devices or may be provided using a single device configured to perform two sensing functions, in effect allowing a single device to act as both first and second sensors.

The second non-magnetic sensor may have a zone of detection that is at least partially different to that of the first non-magnetic sensor and the signal processing circuit may determine that the object has approached from one direction if the object has entered the second detection zone before it enters the first detection zone and has approached from a different direction if it enters the first zone of detection before the second zone. The direction of travel is therefore determined by combining the outputs of the two sensors.

The protected area may comprise an MRI room, the door being an entrance/exit to/from the room.

The invention therefore provides a non-magnetic sensor means that produces sufficient information that the apparatus and is able to modify the alarm under certain conditions corresponding to an object approaching the door from one direction compared with the alarm if the object approaches from a different direction.

The non-magnetic sensor means may be arranged so that an object approaching the door from within the protected area enters the second zone of detection before the first zone, and in that event it may suppress the alarm. This means that the alarm is not issued if a person or object is leaving the protected area. If the object is detected as entering the protected area, or about to enter, the alarm may not be suppressed.

The modification to the alarm may comprise suppressing the alarm completely, or partially. For instance if the alarm is both audible and visible, the audible part may be suppressed whilst the visible alarm is still issued.

The second non-magnetic sensor may in a position of use be arranged to detect an object approaching the doorway from within the protected area prior to the object being detected by the first non-magnetic sensor so that the alarm is suppressed whenever an object, such as a person, approaches the doorway from within the protected zone. This allows the alarm to be suppressed as an object or person leaves the protected zone.

In such an arrangement the signal processing circuit may suppress the alarm for a defined period of time sufficient to allow a person to move through the doorway entering and then leaving the detection zone of the first sensor apparatus.

The delay may be from 10 seconds to 30 seconds. It is preferred that the delay is kept as short as possible. This can be achieved best by arranging for the third sensor to only detect an object approaching a very short distance prior to the second sensor being triggered.

In an alternative the period of time need not be predetermined, and the signal processing circuit may suppress the alarm until such time as the object has entered and then left the detection zone of the first sensor apparatus.

The applicant has appreciated that there is no need to raise an alarm when a person or object is leaving a protected area, such as an MRI room, and suppressing the alarm will in effect halve the number of times the alarm may operate when a person or object that is ferromagnetic passes through the doorway. Reducing the number of times the alarm sounds in this way may lead to an increase in safety as well as user satisfaction with the apparatus as alarms issued when a person is safely leaving a room are considered a nuisance.

The protected area may comprise the inside of an MRI room and the second detection zone may in use cover an area extending into the room across the doorway. The first detection zone may be located in the entrance or close to the entrance, i.e. outside of the MRI room. Indeed as long as an object must pass through the first detection zone in passing through the entrance, but will enter the second detection zone prior to entering the first zone when leaving the protected area. the skilled person will appreciate that there is flexibility in the choice of detection areas.

The first non-magnetic sensor and the second non-magnetic sensor may each comprise an optical sensor and a light beam, the beam extending across a region of space that defines a respective detection zone. For the second non-magnetic sensor to define a detection zone within the MRI room the light source may be located on the outside of the door and shine a beam onto a retroreflector located inside the room which sends the beam back to an optical sensor located outside of the room. This beam can be oriented such that it connects the sensor and retroreflector whenever the door is open and spans the width of the doorway.

The first and second non-magnetic sensors may comprise at least one of a photo-electric sensor, a fibre-optic sensor, a passive infra-red sensor, a camera, an ultrasonic sensor, a radar sensor, an electrostatic sensor, and a millimeter wave sensor. By photo-detector we mean any detector which is able to detect incident photons, whether in the visible or non-visible spectrum.

In one arrangement, the first non-magnetic sensor may comprise a pair of optical detectors, each associated with a light source which produces a beam of light that impinges on the photo-detector, the output of each photo-detector changing state when the respective light beam is broken. The light beams may be aligned so that they do not overlap spatially in which case the whole of the light beam may define the zone of detection of the secondary sensor. Alternatively, the beams may overlap spatially in a region that lies outside of the respective detection zones of the two secondary sensors.

When used in an environment which includes a door the beams simply need to be aligned so that the door does not pass through the region in which the beams overlap spatially.

To aid alignment, the optical detectors and associated light sources may be located on or within a rotatable housing or turret secured to a body of the apparatus, enabling the orientation of the beams to be easily adjusted. A lock screw may be provided to fix the housing at the desired angle once installation is complete. This rotatable housing may comprise a pod secured to a top or bottom a larger housing which accommodates other parts of the apparatus such as the signal processor.

The applicant has realised that the rotatable housing may be used in combination with the earlier arrangement disclosed in GB 2 395 276 or WO 2012/022971 the teachings of which are incorporated herein by reference. By this application the applicant may seek protection for an apparatus as disclosed in that earlier application, or an apparatus described in any of the claim of this application, that includes one or more optical sensors mounted on a rotatable housing or turret.

By rotatable we mean that the housing can be secured in at least two different angular positions relative to the body of the apparatus. It may be positionable in an infinite number of angular positions within a range of 10 degrees, or 20 degrees or 90 degrees to each side of a neutral position. The body may, for instance, comprise an elongate housing with the turret at one end, preferably a lower end. An alarm may be located at the other, preferably upper, end of the elongate housing. During installation the housing may initially be secured to a wall alongside a doorway and the turret then rotated to the desired position before being secured. The turret may be rotatable in one plane or in two planes.

In an alternative, the non-magnetic sensor means may comprise an ultrasonic sensor that emits ultrasonic radiation and detects reflected parts of the emitted radiation. It may comprise a radar sensor that emits radar waves and monitors a reflected part of the emitted waves. Using ultrasound or radar a single sensor may be used to both detect an object in a primary detection zone and detect the direction in which it is travelling based on the characteristics of the reflected signals. Typically these sensors rely on the transmission of short burst of radiation which are then detected as reflections, the time of flight of the detected reflections being used to detect position. Using the well known Doppler effect the direction of travel may also be detected by looking at the frequency of the detected reflected part and correlating with the frequency of the associated transmitted signals. Such technology is well known in other applications, and as such the operation of the sensor will not be described here in any detail.

An optical sensor may be used to define the primary detection zone, and an ultrasonic or radar sensor may be used to detect an object approaching the doorway. Alternatively, a single sensor could be used to detect objects in the primary zone and detect an object approaching the doorway, either from within the primary zone or outside of the zone. A single ultrasonic or radar sensing apparatus may therefore define both a first and second non-magnetic sensor.

The magnetic sensor apparatus may comprise at least two primary sensors, each sensor adapted to measure an ambient magnetic field or its gradient within a localised volume of space defined by a zone of sensitivity of the first and second magnetic sensors and to produce a corresponding measurement signal, the two sensors being secured in position with one on each side of a doorway.

The, or each, magnetic sensor may separable from the signal processing circuit such that, in use, the at least one separable sensor may be disposed remotely to the signal processing means. Similarly the secondary sensing apparatus may be separable from the signal processing circuit and, optionally, the primary sensor apparatus.

The signal processing means may comprise filter means arranged to substantially reject spurious variations in the measured magnetic field. The filter means may comprise a high-pass filter and in one convenient arrangement the filter may be responsive to the measurement signal produced by the primary sensor means to attenuate variations therein having a frequency of less than 0.3 Hz.

The filter means may additionally comprise a low-pass filter which may be responsive to the measurement signal produced by the primary sensor means to attenuate variations therein having a frequency of greater than 3 Hz.

The signal processing circuit may comprise means for comparing the amplitude of the output from the filter means with an adjustable threshold level so as to indicate temporal variations in the measurement signal due to the movement of a ferromagnetic object within an ambient magnetic field.

Whilst it is advantageous under the invention of the first aspect to prevent the issue of alarms when an object is leaving a protected area, the applicant has also appreciated that a more selective suppression of the alarm either for objects leaving a protected area or for objects entering the area or both entering or leaving would be advantageous.

Therefore, according to a second aspect the invention provides apparatus for protecting an entrance to a protected area, the apparatus comprising:

at least one magnetic sensor adapted to measure an ambient magnetic field or gradient within a localised volume of space defined by a first zone of sensitivity of the at least one magnetic sensor, and to produce a corresponding measurement signal, a non-magnetic sensor means adapted to detect the presence of objects within a primary detection zone in the vicinity of the magnetic sensor apparatus, an RF receiver which is adapted to receive an identity signal from a transducer when the transducer is within a detection zone, a memory which stores one or more identity codes corresponding to respective identities of transducers, a signal processing circuit arranged in communication with the magnetic sensor apparatus, the first non-magnetic sensor apparatus and the RF receiver, and a warning device operable by an output signal from the signal processing circuit, the warning device adapted to provide within the vicinity of primary sensor apparatus at least one of an audible and a visible warning, and further in which:

the signal processing circuit is configured to identify temporal variations in the measurement signal due to the movement of a ferromagnetic object within the ambient magnetic field and to correlate the identified temporal variations in the measurement signal with instances in which the non-magnetic sensor means detects the presence of an object in its detection zone, and in which the signal processing circuit is arranged to cause the alarm to operate in the event that the correlation is indicative of the presence of a ferromagnetic object in the primary detection zone but to modify the operation of the alarm in the additional event that the RF receiver detects a transducer which has an identity that is stored in the memory.

The RF receiver may comprise and RFID tag reader, and the transducer radio frequency identify tags (RFID tags). The receiver may be sensitive to ultra high frequency (UHF) or High frequency (HF) radiation, and may have a detection range of the order of a few tens of cms, typically up to 30 cm.

The modification may comprise suppressing the alarm if the presence of an RFID tag of a known identity is detected by the RFID receiver.

In a refinement, rather than suppressing the alarm the system may modify the threshold at which an alarm is triggered as a function of the magnitude of the temporal variations in magnetic field detected by the magnetic sensor when a known RFID tag is detected.

For example, the memory may store alongside each identity in the memory a value indicative of a ferromagnetic profile associated with an RFID tag, the profile being used by the apparatus to set the threshold level of change of magnetic field which may trigger an alarm. The circuit may look up the value and trigger and raise an alarm accordingly.

The memory may allocate one of a set of predefined thresholds. For instance, some tags may be associated with a low threshold so that the sensitivity of the system is relatively high, an alarm being raised if a weakly ferromagnetic (or smaller but relatively more ferromagnetic) object is passing. Other tags may be associated with a higher threshold so that larger objects can pass without raising an alarm. Some tags may be associated with a value that suppresses the alarm completely if the tag is detected.

As well as allocating a threshold for each tag, the memory may also store information indicative of a desired duration for the suppression associated with each tag. The signal processor may then apply the suppression for the time stored in the memory. Once that time has elapsed, if the tag is detected the alarm may be raised (not suppressed) if the conditions are met. It is appreciated that for some large pieces of equipment it may take a long time to move through the doorway and so a long time of suppression is needed. For smaller items, such as personal clothing, it can be expected they will move quickly through the doorway so a shorter time of suppression is appropriate. Clearly, the shorter the time in which the alarm is suppressed the less the chance of other, unidentified but potentially dangerous, items being allowed to pass without an alarm being raised.

The apparatus may therefore include at least one RFID tag which can be allocated to person who is to pass through the entrance, or can be stuck to, embedded into or otherwise attached to an object that might move through the protected entrance.

The apparatus may further include one or more ferromagnetic objects which have attached thereto an RFID tag, that identity of the RFID tag being stored in the memory of the apparatus. Most preferably the memory also stores a value alongside the identity which corresponds to the ferromagnetic profile of the object.

The invention of the first aspect and the second aspect can be used to reduce the number of alarms that are raised that might be considered to be unwanted. As such the features of the first and second aspects can be combined, producing an apparatus having the second non-magnetic sensor to detect the approach of objects within the zone with the RF reader to discriminate between different types of safe and unsafe object. However, in its own right the invention of the first or second aspect of the invention does not directly address the situation in which the door itself might be the cause of genuine false alarms because it is made of or includes items of ferromagnetic material or has induced Eddy currents.

Therefore, according to a third aspect the invention provides apparatus for protecting an entrance to a protected area comprising:

at least one magnetic sensor adapted to measure an ambient magnetic field or gradient within a localised volume of space defined by a first zone of sensitivity of the at least one magnetic sensor, and to produce a corresponding measurement signal, a non-magnetic sensor means adapted to detect the presence of objects within a detection zone in the vicinity of the magnetic sensor apparatus, a signal processing circuit arranged in communication with the magnetic sensor apparatus and non-magnetic sensor means, and a warning device operable by an output signal from the signal processing circuit, the warning device adapted to provide within the vicinity of primary sensor apparatus at least one of an audible and a visible warning, wherein the signal processing circuit is configured to identify temporal variations in the measurement signal due to the movement of a ferromagnetic object within the ambient magnetic field and to correlate the identified temporal variations in the measurement signal with instances in which the non-magnetic sensor means detects the presence of an object in the zones, and to cause the warning device to raise an alarm in the event that the correlation is indicative of the presence of a ferromagnetic object in the vicinity of the primary sensor apparatus;

and further comprising:

a door position sensing means which is adapted to monitor the angular position of a door of the entrance, and in which the signal processing circuit is adapted to modify the operation of the alarm in the event that output of the door position sensing means indicates that the door is moving.

The apparatus may modify the operation of the alarm by suppressing the alarm if the door is moving, or if the door is moving and one or more conditions are met.

Whilst suppressing the operation of the alarm if the door is moving removes the chance of false alarms being generated, it does leave the possibility that a ferromagnetic object may pass through the door as it is opening. It is undesirable in such an event for the alarm to be fully suppressed.

Therefore, in a refinement the apparatus may not fully suppress the alarm if it is moving but instead alter the threshold at which an alarm is raised according to the position at which the door is located and/or the rate at which the door is opening or closing. This allows the magnetic effects caused by the door to be compensated for.

The duration of the suppression of the alarm may be controlled by the signal processing means. A user operable input (such as a switch or button) may be provided which enables the user to turn the suppression on or off as required. For example, the apparatus may be set so that the suppression of the alarm never happens, a so called override mode, or set so that the alarm is suppressed when the door opens/closes.

In a further refinement the apparatus may include a memory which stores historical data information about the change in ambient magnetic field in the zone of sensitivity of the magnetic sensor, and in the event that the output of the door position sensing means indicates that the door is moving at the same time that the second sensor indicates the presence of an object in the first detection zone, the apparatus is arranged to cause an alarm to be raised if the stored historical data indicates that the ambient magnetic field was changing prior to the start of the movement of the door.

The historical information may be obtained by sampling the output of the magnetic sensor periodically.

Looking back to a time just prior to the door moving to see if the magnetic field was changing provides a good estimate of whether a ferromagnetic object was close to the door, and the raising of the alarm is made on the assumption that the same object that is in the detection zone of the non-magnetic sensor means when the door is moving is the same ferromagnetic object as was detected. This may lead to the occasion false alarm, but this may be preferable to a completely suppressed alarm.

In a refinement, the signal processing circuit may be adapted to compare the stored historical data with baseline data and information indicative of the position of the door to remove from the data the effect of the movement of the door, and in the event that the correlated data indicates the presence of a moving magnetic object in the detection zone of the magnetic sensor may reactivate the alarm.

This may allow data to be used that was recorded even when the door was moving, rather than looking back at historical data obtained from a time before the door started to move.

The apparatus may store the baseline data in memory. This data may be actual data obtained during installation of the apparatus as the door is opened and closed and the output of the magnetic sensor is sampled. At the same time the output of the position sensor may be sampled and stored together with the magnetic data. Each door might produce a unique variation in the magnetic field, and by storing this in memory it can be "substracted" from the observed change to allow the effect of movement of the door to be removed from any correlation used during the raising of an alarm.

The door position sensing means may comprise a rotary encoder that connects the door and the door frame. It may comprise an optical sensor having a source and detector secured to the door or relative to the frame, and a reflector which reflects light from the source onto the detector, the sensor determining the distance between the detector and reflector. It may comprise an infra red or ultrasonic distance measurement sensor, linear encoder, potentiometer sensor, strain gauge, camera, pneumatic bladder with pressure sensor.

The door position sensor may use infrared light. It may be combined with the non-magnetic sensing means as a single sensing device. For example, an ultrasonic sensor or radar sensor may detect the presence and movement of objects in the vicinity of the door, including being sensitive to the position of the door. This can be achieved provided the door and the primary detection zone are in the field of view of the sensor. The sensor may also determine whether the door is moving or stationary.

According to a fourth aspect the invention provides an apparatus for protecting an entrance to a protected area comprising:

at least one magnetic sensor adapted to measure an ambient magnetic field or gradient within a localised volume of space defined by a first zone of sensitivity of the at least one magnetic sensor, and to produce a corresponding measurement signal, a non-magnetic sensing means adapted to detect the presence of objects within a detection zone in the vicinity of the magnetic sensor apparatus, a signal processing circuit arranged in communication with the magnetic sensor apparatus and non-magnetic sensing means, and a warning device operable by an output signal from the signal processing circuit, the warning device adapted to provide within the vicinity of the magnetic sensor at least one of an audible and a visible warning, wherein the signal processing circuit is configured to identify temporal variations in the measurement signal due to the movement of a ferromagnetic object within the ambient magnetic field and to correlate the identified temporal variations in the measurement signal with instances in which the non-magnetic sensing means detects the presence of an object in the zones, and to cause the warning device to raise an alarm in the event that the correlation is indicative of the presence of a ferromagnetic object in the vicinity of the primary sensor apparatus;

and further comprising:

a door position sensing means which is adapted to monitor the angular position of the door relative to a door of the entrance, and and further comprising a memory which in use stores historical temporal variations in the measurement signal due to movement of a ferromagnetic object within the ambient field, and correlation means which is adapted to correlate the stored historical temporal variations in the measurement signal prior to the door moving with incidences in which the non-magnetic sensing means detects the presence of an object in its detection zone, and in which the apparatus is arranged to cause the warning device to raise an alarm in the event that the correlation, albeit separated in time, is indicative of the presence of a magnetic object in the vicinity of the magnetic sensor.

The first, second, third and fourth aspects of the invention may, of course, be combined to provide an apparatus that has any combination of the features described herein before.

According to a fifth aspect the invention provides a protected doorway assembly for a room comprising:

a doorframe housing a door, and an apparatus according to one ore more of the first, second or third aspects of the invention.

The doorway may comprise a doorway into an MRI room.

According to a sixth aspect the invention provides a method of protecting a doorway of a room, such as an MRI room, comprising the steps of:

(a) Measuring an ambient magnetic field or its gradient using passive primary sensing means comprising a magnetic sensor, and producing a corresponding measurement signal;
(b) Detecting the movement of objects in the vicinity of the primary sensor means using a first non-magnetic sensor means comprising at least one sensor adapted to detect the presence of objects within a respective zone in the vicinity of the primary sensor apparatus,
(c) Identifying temporal variations in the measurement signal produced by the magnetic sensor means due to the movement of a ferromagnetic object within the ambient magnetic field within a localised volume of space defined by a zone of sensitivity of the magnetic sensor,
(d) Assessing the identified temporal variations in the measurement signal in conjunction with movement of objects detected by the non-magnetic sensor means to determine a correlation there-between, and
(e) In the occurrence of such a correlation and with both the sensors identifying the simultaneous presence of an object in their respective zones providing an indication of the presence of a ferromagnetic object, (f) Detecting the movement of objects in the vicinity of the magnetic sensor means using a second non-magnetic sensor means comprising at least one sensor adapted to detect the presence of objects within a respective zone in the vicinity of the primary sensor apparatus which is located so that an object may enter the zone prior to entering the detection zone of the second sensor means,
And
(g) suppressing the alarm signal for a period of time following the detection of an object in the detection zone of the second non-magnetic sensor means prior to entering the detection zone of the second sensor.

According to a seventh aspect the invention provides a method of protecting a doorway of a room, such as an MRI room, comprising the steps of:
(a) Measuring an ambient magnetic field or its gradient using passive primary sensing means comprising at least a first magnetic sensor, and producing a corresponding measurement signal;
(b) Detecting the movement of objects in the vicinity of the primary sensor means using second, non-magnetic sensor means, the second sensor means comprising at least one sensor adapted to detect the presence of objects within a respective zone in the vicinity of the primary sensor apparatus,
(c) Identifying temporal variations in the measurement signal produced by the first sensor means due to the movement of a ferromagnetic object within the ambient magnetic field within a localised volume of space defined by a zone of sensitivity of the magnetic sensor,
(d) Assessing the identified temporal variations in the measurement signal in conjunction with movement of objects detected by the second, non-magnetic, sensor means to determine a correlation there-between, and
(e) In the occurrence of such a correlation and with both the secondary sensors identifying the simultaneous presence of an object in their respective zones providing an indication of the presence of a ferromagnetic object,
wherein the step of providing the indication of the presence of a ferromagnetic object comprises the step of producing within the vicinity of the primary sensor means at least one of an audible and a visible alarm,
(f) Detecting the movement of objects in the vicinity of the primary sensor means using a third, non-magnetic sensor means, the third sensor means comprising at least one sensor adapted to detect movement of the door of the doorway;
(g) and modifying the alarm in the event that the door is moving.

The method may comprise suppressing the alarm if the door is moving.

It may comprise, in the event that the door is moving, performing the correlation using only historical temporal variations in the measurement signal obtained prior to the time that the door started to move.

According to an eighth aspect the invention provides a method of protecting a doorway of a room, such as an MRI room, comprising the steps of:
(a) Measuring an ambient magnetic field or its gradient using passive primary sensing means comprising at least a first magnetic sensor, and producing a corresponding measurement signal;
(b) storing in a memory historical temporal variations in the measurement signal due to movement of a ferromagnetic object within the ambient field,
(c) Detecting the movement of objects in the vicinity of the primary sensor means using second, non-magnetic sensor means, the second sensor means comprising at least one sensor adapted to detect the presence of objects within a respective zone in the vicinity of the primary sensor apparatus,
(d) Identifying temporal variations in the measurement signal produced by the first sensor means due to the movement of a ferromagnetic object within the ambient magnetic field within a localised volume of space defined by a zone of sensitivity of the magnetic sensor,
(e) Assessing the identified temporal variations in the measurement signal in conjunction with movement of objects detected by the second, non-magnetic, sensor means to determine a correlation there-between, and
(f) In the occurrence of such a correlation and with both the secondary sensors identifying the simultaneous presence of an object in their respective zones providing an indication of the presence of a ferromagnetic object,
wherein the step of providing the indication of the presence of a ferromagnetic object comprises the step of producing within the vicinity of the primary sensor means at least one of an audible and a visible alarm,
(g) Detecting the movement of objects in the vicinity of the primary sensor means using a third, non-magnetic sensor means, the third sensor means comprising at least one sensor adapted to detect movement of the door of the doorway;
(h) in the event that the door is moving correlating the stored historical temporal variations in the measurement signal prior to the door moving with incidences in which the non-magnetic sensor apparatus detects the presence of an object in its detection zone, and
(i) and modifying the alarm in the event that the door is moving by raising an alarm in the event that the correlation, albeit separated in time, is indicative of the presence of a magnetic object in the vicinity of the magnetic sensor or suppressing the alarm if the correlation, albeit separated in time, does not indicate the presence of a magnetic object in the vicinity of the magnetic sensor.

There will now be described by way of example only, several embodiments.

Figure 1:
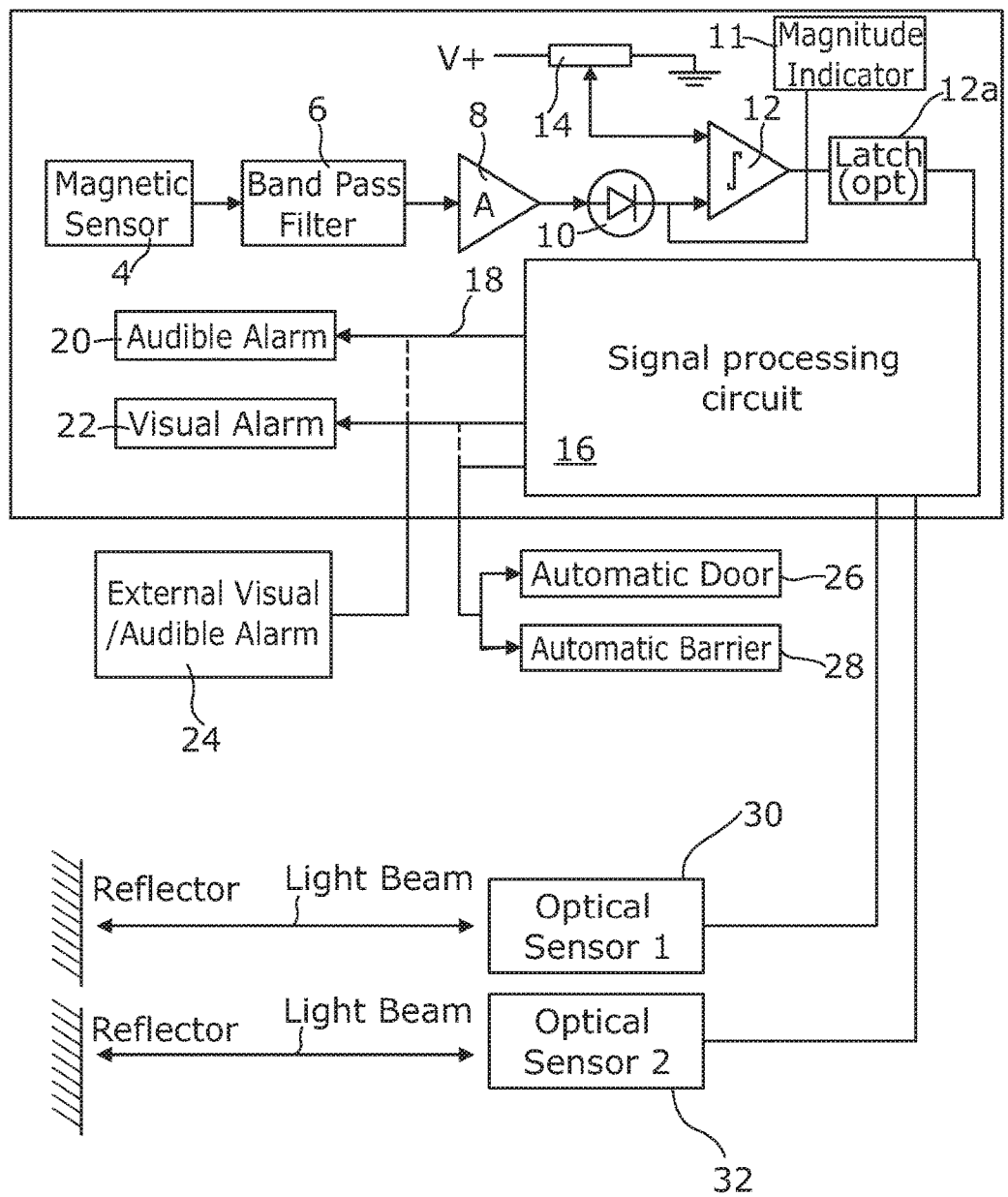
FIG. 1 is a schematic view of a first embodiment of the present invention which includes a second light beam that detects the approach of objects from inside of a room.

Referring to FIG. 1, a first embodiment of a protection apparatus for use in protecting an entrance to a protected area is shown. For the purpose of this example, the protected area is an MRI room, typically a shielded space in which a magnetic resonance imaging machine (MRI machine) is located. These rooms are often found in larger hospitals or universities. The entrance comprises a doorway which is fitted with a magnetically shielded, side hung, door in a doorframe. The apparatus protects the doorway of the room by raising an alarm, in appropriate circumstances, if it detects that a ferromagnetic object is passing or about to pass through the doorway.

The apparatus includes a primary magnetic sensing apparatus comprising a magnetic sensor 4, such as a fluxgate sensor, a magneto-resistive sensor, a magneto-impedance sensor, a Hall Effect sensor, or a galvanic coil sensor, that outputs a signal that is a measurement of the magnetic field incident upon the sensor 4. Sensor 4 may be an arrangement of more than one sub-sensor such as a balanced pair or an array of magnetometers. Since the apparatus will typically be fixed in position proximate a doorway that is being protected, for most of the time the sensor will register a largely unchanging magnetic field due to the earth or where the door is an entryway to and MRI machine, the combination of the earth's magnetic field with the fringe field of the MRI's magnet. This constitutes a large offset on the output of the sensor. This constant offset can be removed using a high pass filter. The sensor will also likely measure regular changes in the magnetic field associated with the power supply for electrical equipment located near the doorway which will cause the output to vary at the supply frequency and its harmonics. This can also be filtered out using a low pass filter. The filters collectively constitute a band-pass filter 6 to perform these functions.

It is known that it takes between 0.3 seconds and 3 seconds, typically, for a person to pass through a doorway. The reciprocal of these times defines the frequencies of interest in the output of the sensor 4, i.e. 0.3 to 3 Hz.

If a ferromagnetic object carried, or pulled or pushed, by a person passes close to the sensor 4, the ambient magnetic field will be altered causing a change in the output of the sensor 4. That change will pass through the filter 6 and be amplified by an amplifier 8. In order to trigger an alarm the signal size is compared with a preset threshold.

Because the signal may be positive or negative, the threshold detector consists of a rectification stage 10 followed by a comparator 12 that has a circuit 14 to provide a threshold voltage. Alternatively, separate comparators are used for positive and negative signals with the outputs combined to give a single alarm signal instead of a rectifier 10 and a single comparator 12. An optional latch 12a may be provided which holds the value of the signal output from the comparator for a predetermined period—perhaps up to 1 second. The output of the latch is therefore a digital signal, with either a logic "zero" value or a logic "one" value. The presence of a logic "one" value at the output of the latch will, in some circumstances as outlined below, cause the alarm to be raised.

To raise the alarm the output of the latch 12a is fed into a signal processing circuit 16 whose output 18 is fed to one or more warning devices such as an audible alarm 20 and a visual alarm 22, and an optional external alarm 24. It has been found to be beneficial, although not essential, that both a visual and audible alarm is provided.

In addition, a visual indicator 11 of the magnitude of the magnetic signal may be included. For instance, a series of amber light "bars" may be provided which are illuminated sequentially as the output signal increases in strength up to the threshold, and once the threshold is reached a red light may be illuminated. The output of the comparator may be arranged to have logic level zero for the state where the signal does not exceed the threshold, and level 'one' for the state when the signal has exceeded the threshold. Once an object has passed out of range of the magnetic sensor 4 the logic level returns to zero once the signal level has dropped below the threshold. In practice, it may be preferable that the alarm continues for an elapsed time defined by a reset delay and a latch such as a flip-flop that maintains the output at logic zero until the button is pressed.

Figure 4:
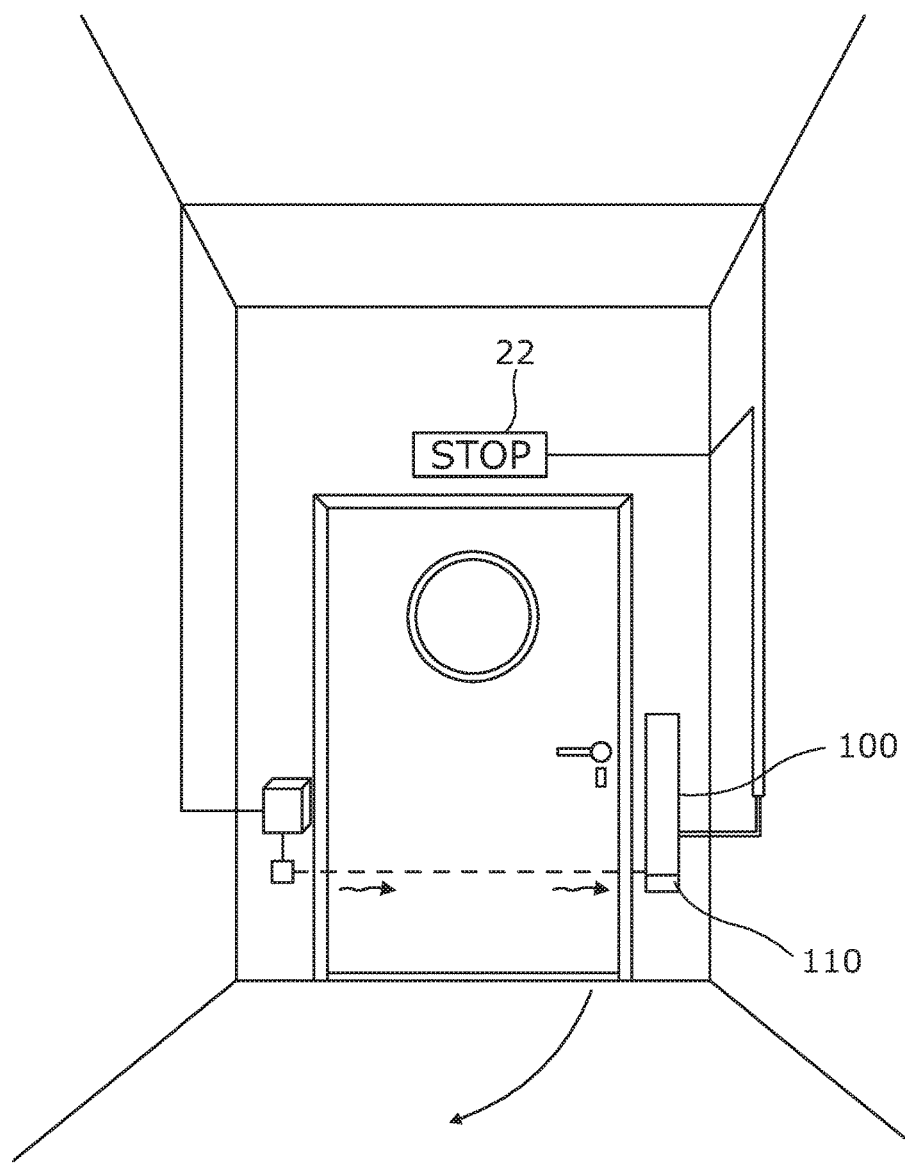
FIG. 4 is a general view of a doorway of a protected MRI room showing a possible location for installing apparatus of the invention.

To reduce false alarms, the apparatus further includes a secondary, complimentary, non-magnetic sensing means 30 that senses when a person passes through the doorway or is about to pass through the doorway. The non-magnetic sensing means in this example comprises a non-magnetic sensor 30 having a distinct zone of protection. This zone should, of course, lie at least in part within the region over which the primary sensing apparatus is sensitive to ferrous objects. The extent of the zone is shown stylised form in FIG. 5 of the drawings for a typical installation of the apparatus to a door as shown in FIG. 4 of the drawings.

In the example of the first embodiment the non-magnetic sensor 30 comprises a photo-electric sensor (or any other device that is sensitive to incident light) which is arranged to detect when a person, or other object, passes through a beam of light directed at the sensor. The light beam may be visible or invisible. The beam of light is generated by a light source 31 such as an LED, associated with the photo detector. To protect the doorway it passes fully across a width of the doorway about 1 foot to 2 feet above the ground. The region of space through which the beam passes defines the zone of sensitivity for the sensor. If an object is in the path of the beam, it is in the zone, and will break the beam. Generally speaking a person or large object will break the beam as it tries to pass through the doorway. For better protection a number of beams may criss cross the doorway along different paths. The light sensor and light source are located within a rotatable turret 110 at the base of a main body 100 of the apparatus.

If the beam is unbroken, the output of the sensor 30 is a logical zero and if it is broken by movement of an object into the path of the beam, the output changes to a logical one level. Of course, the logic could be reversed in an alternative embodiment. The output of each sensor may be held for a period, say up to 1 second, using a latch (not shown).

Figure 8:
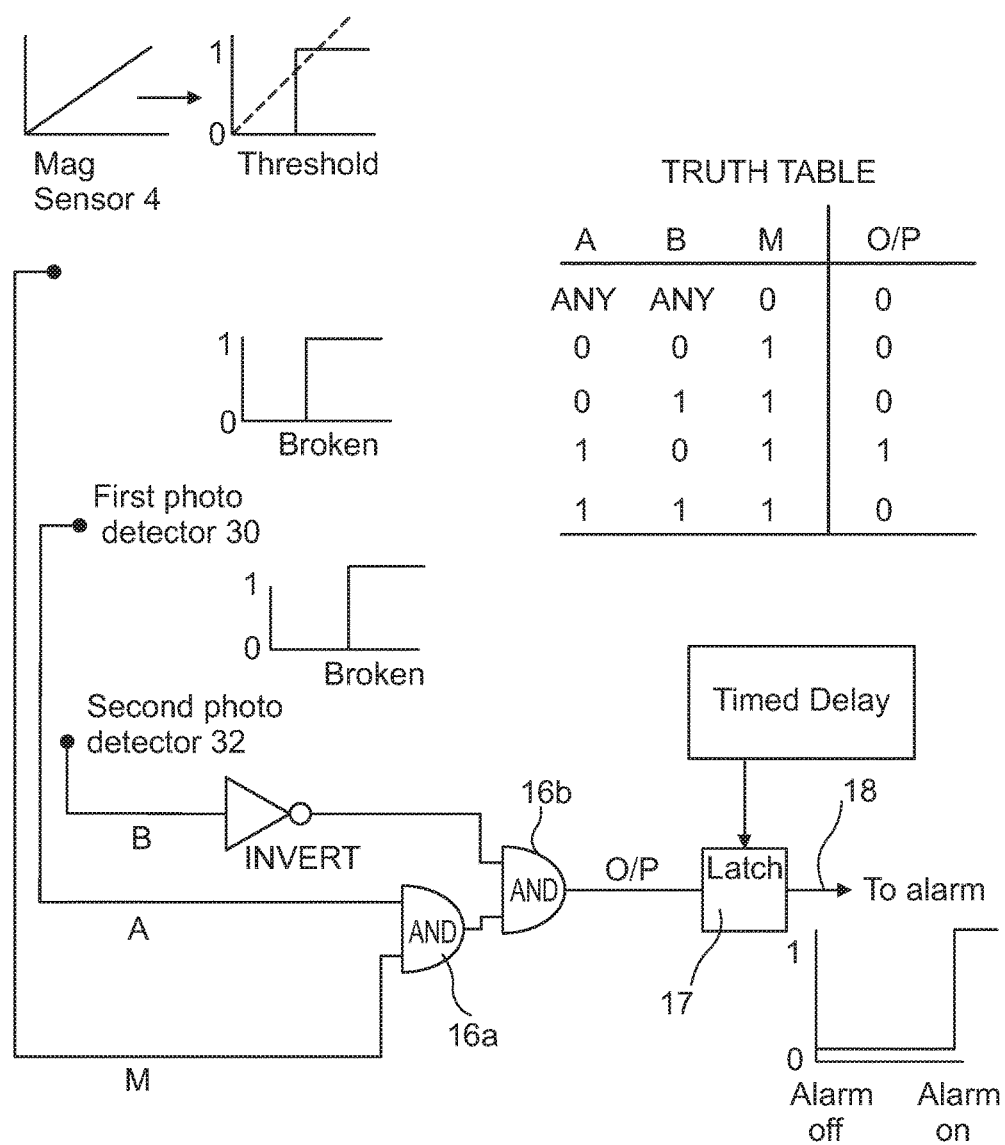
FIG. 8 is an illustration of the logic used within the signal processing circuit of the first embodiment of FIG. 1.
Figure 9:
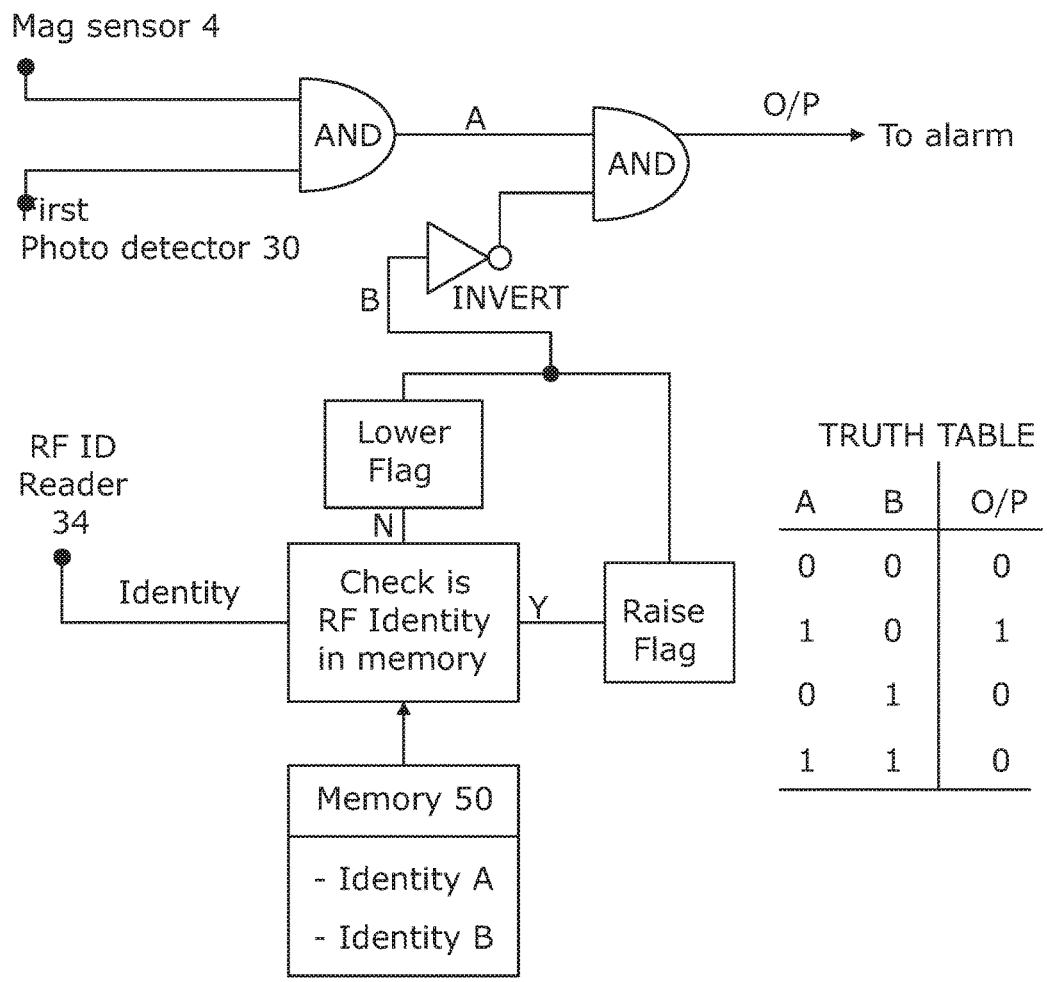
FIG. 9 is an illustration of the logic used within the signal processing circuit of the second embodiment of FIG. 2.

The output of the sensor 30 is fed to one input of the signal processing circuit 16, which in a simple arrangement may comprises a digital logic circuit built using discrete digital logical elements. In its simplest form as shown in FIG. 8 this will comprise an AND gate 16a with the output of the sensor 30 fed to one input of the AND gate and the output of the gate 16a fed to a digital latch 17. The other input of the AND gate 16a is fed with the output of the magnetic sensor comparator 12.

The signal processing circuit 16, in use, performs a correlation function between the magnetic and non-magnetic sensors. If there is a correlation showing the beam is broken and a large change in ambient magnetic field is present, the circuit will typically output a signal which is passed to the alarm circuit (as shown the direct output from the latch is connected to the alarm circuit).

Figure 5:
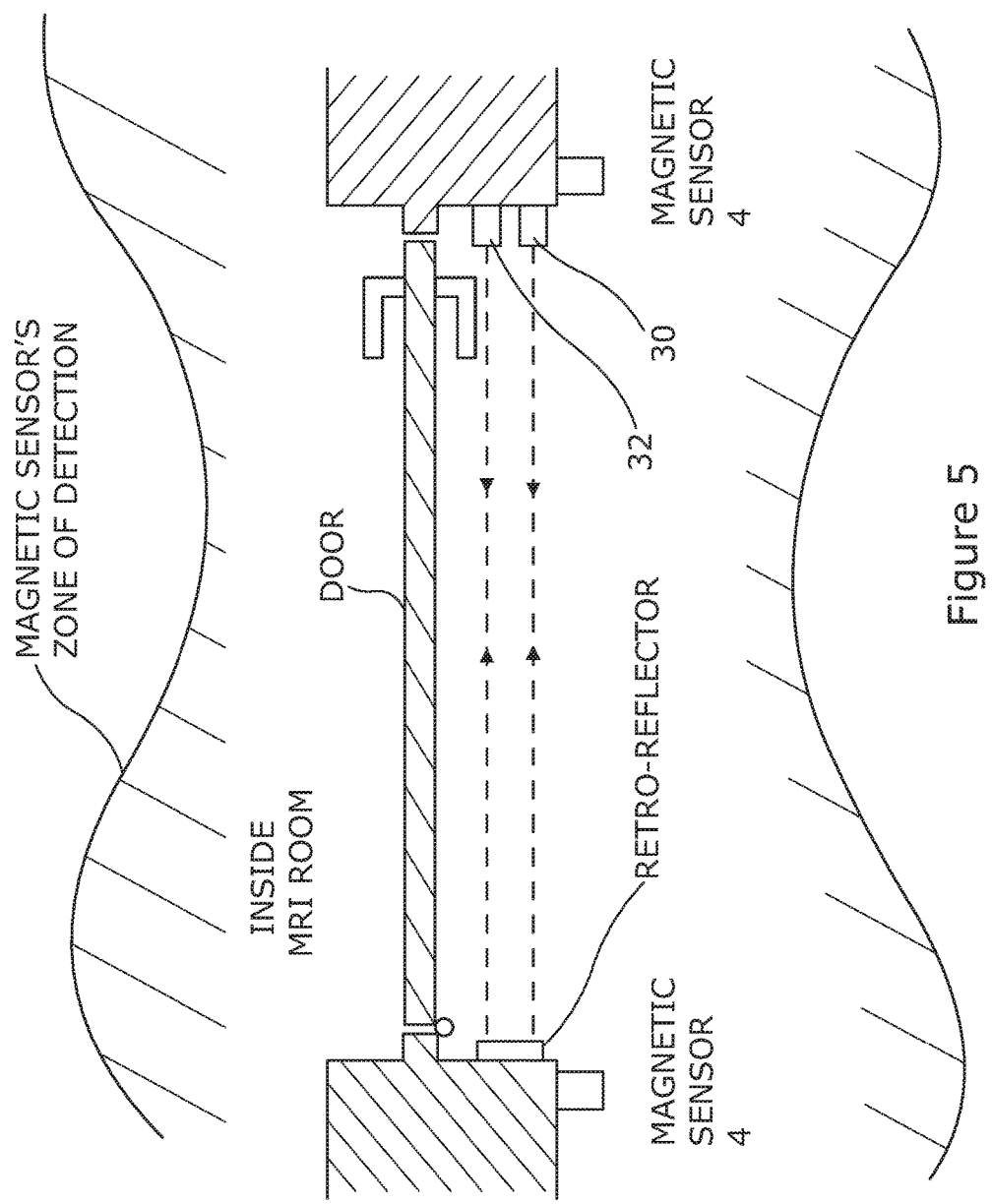
FIG. 5 is a view from above showing the location of the sensors and a stylised representation of the associated zones of detection for the embodiment of FIG. 1.

In addition the embodiment of FIG. 1 the non-magnetic sensor means includes a second non-magnetic sensor 32. This comprises a photo-electric sensor (or any other device that is sensitive to incident light) which is arranged to detect when a person, or other object, passes through a beam of light directed at the sensor in a similar manner to the first non-magnetic sensor apparatus. Again the light beam may be visible or invisible. The beam of light is generated by a light source 33 such as an LED, associated with the photo detector 32. Importantly for this embodiment, the second beam extends across a region close to the inside of the room that is being protected as shown in FIG. 5. The significance of this is that the order in which the beams are broken allows the signal processing circuit to determine the direction in which an object is moving.

The beam of the second photo-electric sensor is arranged to be broken by an object that is approaching the doorway from a position inside the MRI room, the protected area, before the beam of the first non-magnetic sensor apparatus could be broken. The output of the second sensor is fed to the digital circuit 16 and in the event that it indicates that an object has broken the second beam before the first beam has been broken the digital logic circuit causes a suppression of the alarm signal 18. This signal is combined with the output of the latch using a logical AND 16*b* gate so that as long at the suppression signal is at the logic "one" value the output of the AND gate will be low and the alarm suppressed by holding the signal 18 at a low value.

The digital circuit includes a timer circuit which produces a time delay, holding the suppression signal at a high logic level for a preset time of, say, 1-3 seconds. This gives enough time for an object to pass through the doorway with the alarm suppressed.

Notably, if an object approaches the doorway from outside of the room the first beam will always be broken before the second, and so the suppression of the alarm will not occur. The apparatus of the first embodiment therefore provides suppression of the alarm for objects leaving the protected room, whilst maintaining full alarm for objects entering the room.

In a modified example, not shown, the signal processing circuit does not rely upon a timer to produce a set time delay for the suppression of the alarm. Instead, the alarm is suppressed until such time as the object has broken the first beam and subsequently the first beam has been remade. This gives an indication that the object has cleared the doorway.

It will be appreciated that different sensors could be provided. Instead of optical sensors the embodiment could be implemented using ultrasonic or radar sensors. These may be arranged to provide both position information, detecting objects in defined zones, or movement information, allowing movement of objects in the field of view to be detected. A single transmitter and emitter could be used to provide both position and movement information to the signal processing apparatus. Typically sensors that can detect movement exploit the Doppler effect, and can discriminate between objects approaching or moving away from the sensor.

Figure 2:
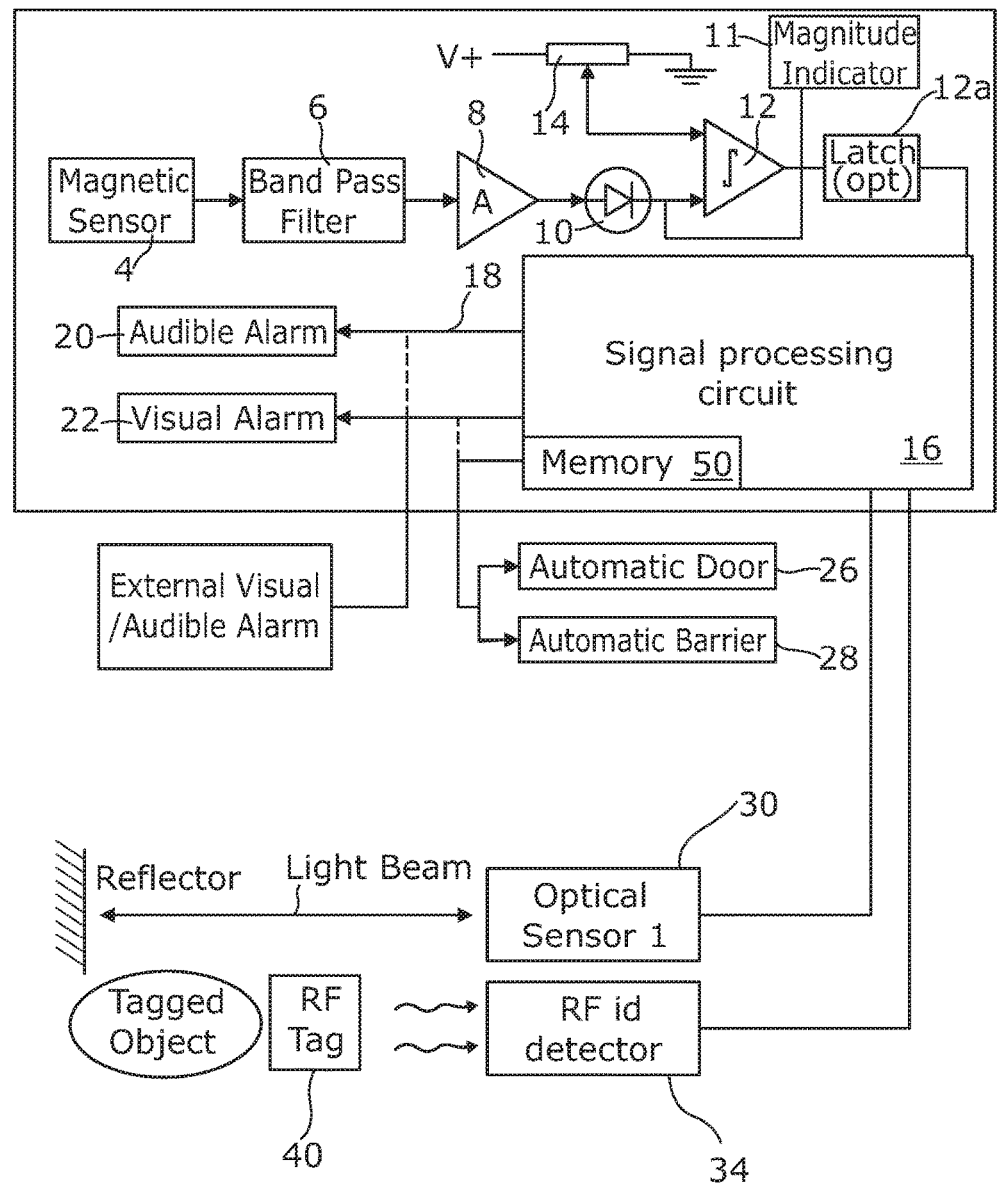
FIG. 2 is a schematic view of a second embodiment of the present invention which includes an RF id tag reader and at least one RF id tag attached to a person or object approaching a protected doorway.

A second embodiment of the present invention is illustrated in FIG. 2 of the drawings. This is generally similar to the first embodiment, and for clarity the same reference numerals have been used to denote like parts of the apparatus. In fact, the apparatus includes all of the parts of the first embodiment, but not the second beam that enables the alarm to be suppressed for objects leaving an MRI room.

Figure 6:
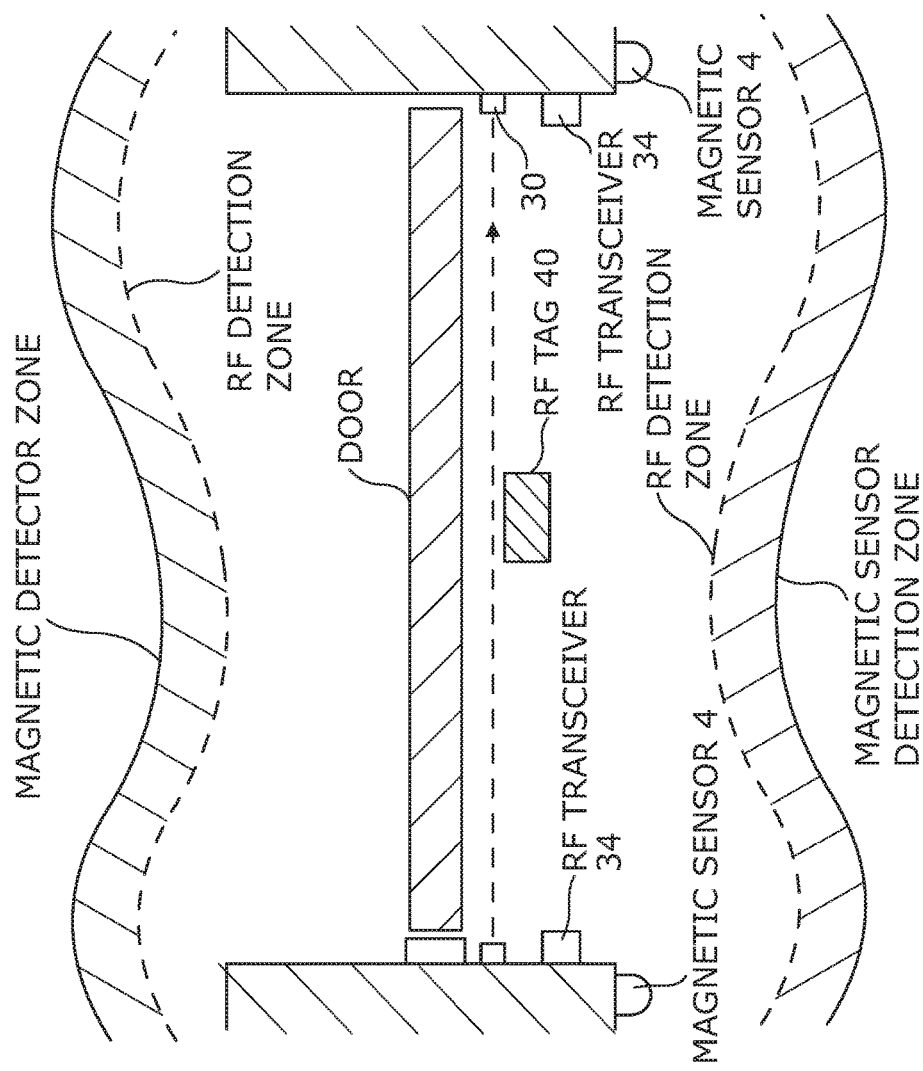
FIG. 6 is a view from above showing the location of the sensors and a stylised representation of the associated zones of detection for the embodiment of FIG. 2.
Figure 10:
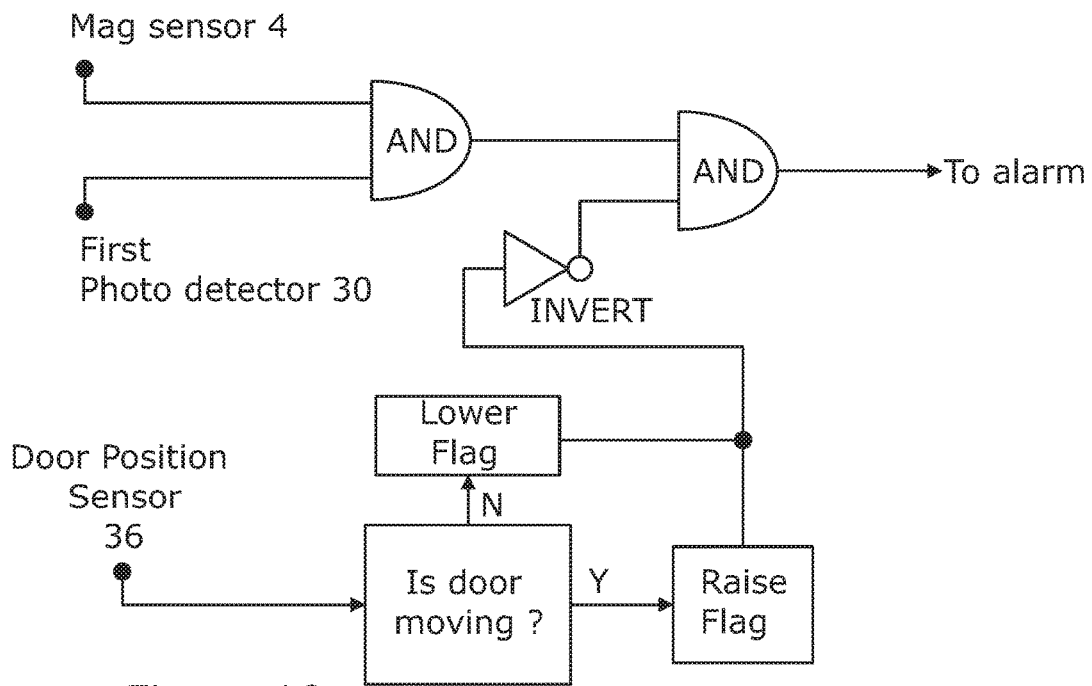
FIG. 10 is an illustration of the logic used within the signal processing circuit of the third embodiment of FIG. 3.

As an alternative to the second beam, a different type of additional sensor 34 is provided that takes the form of an RF identification tag reader 34, a memory 50 in which identities of known RFID tags associated with the apparatus may be stored, and some modifications to the logical operation of the signal processing circuit as shown in FIG. 10. The apparatus is intended to be used along with a number of RFID tags 40, and these may be supplied along with the apparatus. FIG. 6 shows possible locations of the sensors around a protected doorway along with stylised representations of the zones of detection of the sensors.

RFID readers are well known in the art and as such will not be described in detail here. Suffice that the reader is arranged to provide as an output a digital signal providing an identity of any RFID tag that is detected within a zone of detection. For optimal operation this zone should extend across a region that is further away from the doorway that the first beam, and at least overlaps with the zone of sensitivity of the magnetic sensor. Ideally, the range of detection of the reader should be quite low, perhaps only a few tens of cms around the doorway, so as to only read tags that are close to the doorway.

Before the apparatus is used, the memory is loaded with the identities of the tags that are supplied with the system. For this example, there are two RFID tags and the memory stores the two Identities of the tags. These may be loaded into the memory by placing the apparatus into a learning mode, and moving each tag in turn into range of the reader.

In use, upon an object entering the range of the RFID tag reader, the identity of the tag will be output from the reader and fed to the signal processing circuit. The circuit compares the tag with the identities in the memory. If there is a match a flag is raised (moved from logic low to logic high value) to indicate that one of the known tags is near to the doorway. The alarm is then raised or suppressed according to the correlation of the output signals from the magnetic sensor and the photodetector in the same manner described for the first embodiment. The alarm signal is then fed to an AND gate along with the inverted value of the flag so that the alarm is suppressed if a known RFID tag has been detected.

The applicant believes that this system may help remove unhelpful alarms caused by operators passing through the doorway with ferromagnetic objects but who can be trusted to only have done so if it is safe to do so. For instance, an operator who has been trained in when it is safe to move objects, and so can be assumed to not be taking any unsafe objects into a room, may carry an RFID tag and so never trigger the alarm. This might be desirable where the operators might be wearing underwired bras which have become magnetised, whereas otherwise they will either always trigger an alarm or be required to change their clothing.

The memory 40 may, optionally, also store a value alongside each identity in the memory which determines a sensitivity level at which the latch will be triggered. For instance, a more trusted user may be provided with a tag which is associated with a higher threshold and a less experienced user given a tag associated with a lower threshold. Then, when a tag is identified by the circuit the level at which an alarm will be triggered can be set according to the corresponding value stored alongside it in the memory.

This later feature in particular is envisaged as useful where a tag is secured to a ferromagnetic object such as a trolley. The object will have a ferromagnetic profile as seen by the magnetic sensor when it is moved into the detection range of the magnetic sensor. In particular the profile dictates the peak change in magnetic field that is expected to be observed by the magnetic sensor due to the presence of the object. This can be used to set the threshold at which the latch triggers, so that the object alone cannot set off the alarm but the presence of any magnetic object in addition to the object will take cause the threshold to be exceeded and so an alarm may be raised.

Figure 3:
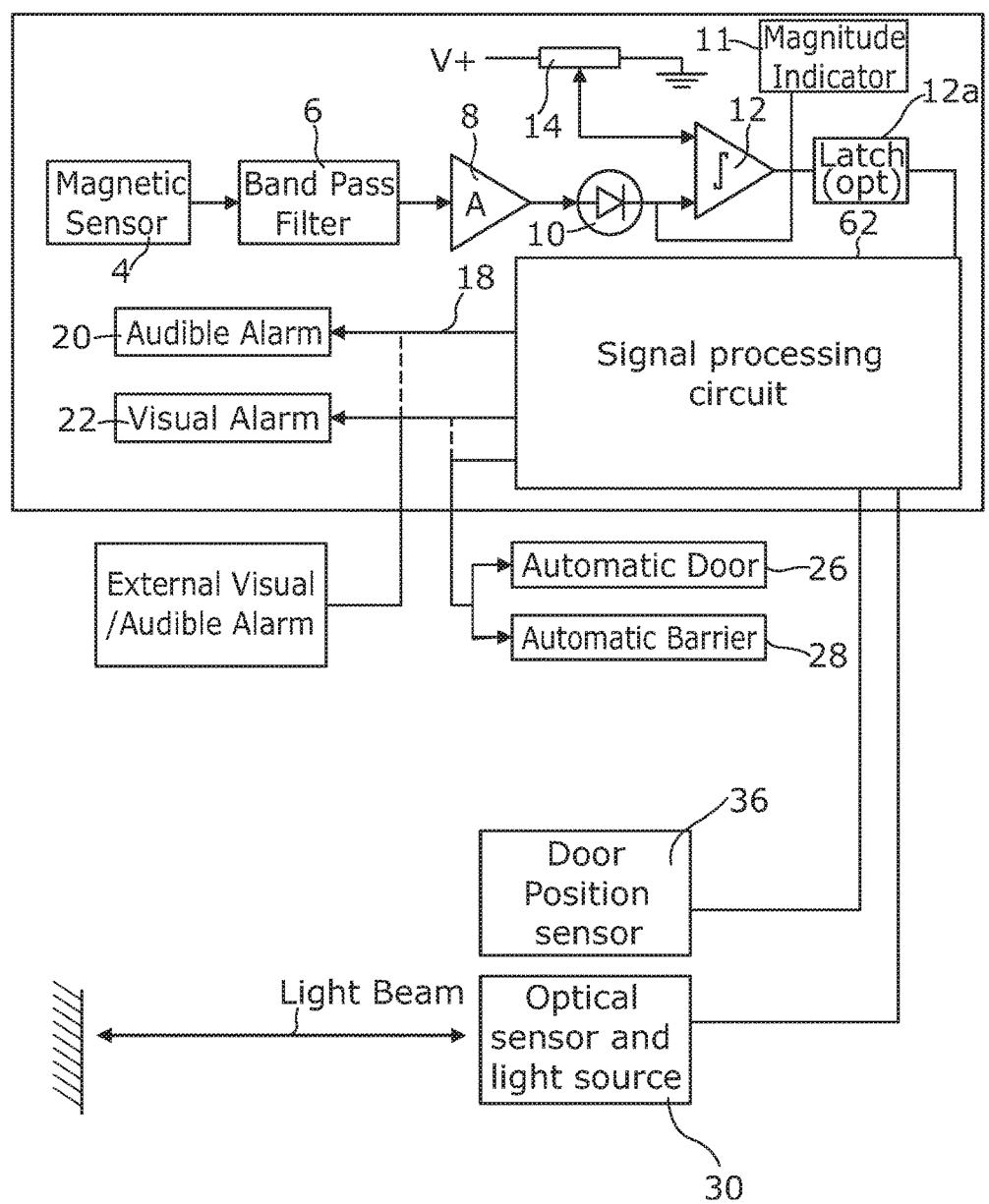
FIG. 3 is a schematic view of a third embodiment of the present invention which includes a door position sensor and which suppresses an alarm if the door is moving.

A still further embodiment is illustrated in FIG. 3. Again those parts which are the same as the first and second embodiments have been represented by like reference numerals. The apparatus includes a magnetic sensor 4 and a first photodetector 30 that detects a break of a light beam that extends across the doorway of a room being protected.

Figure 7:
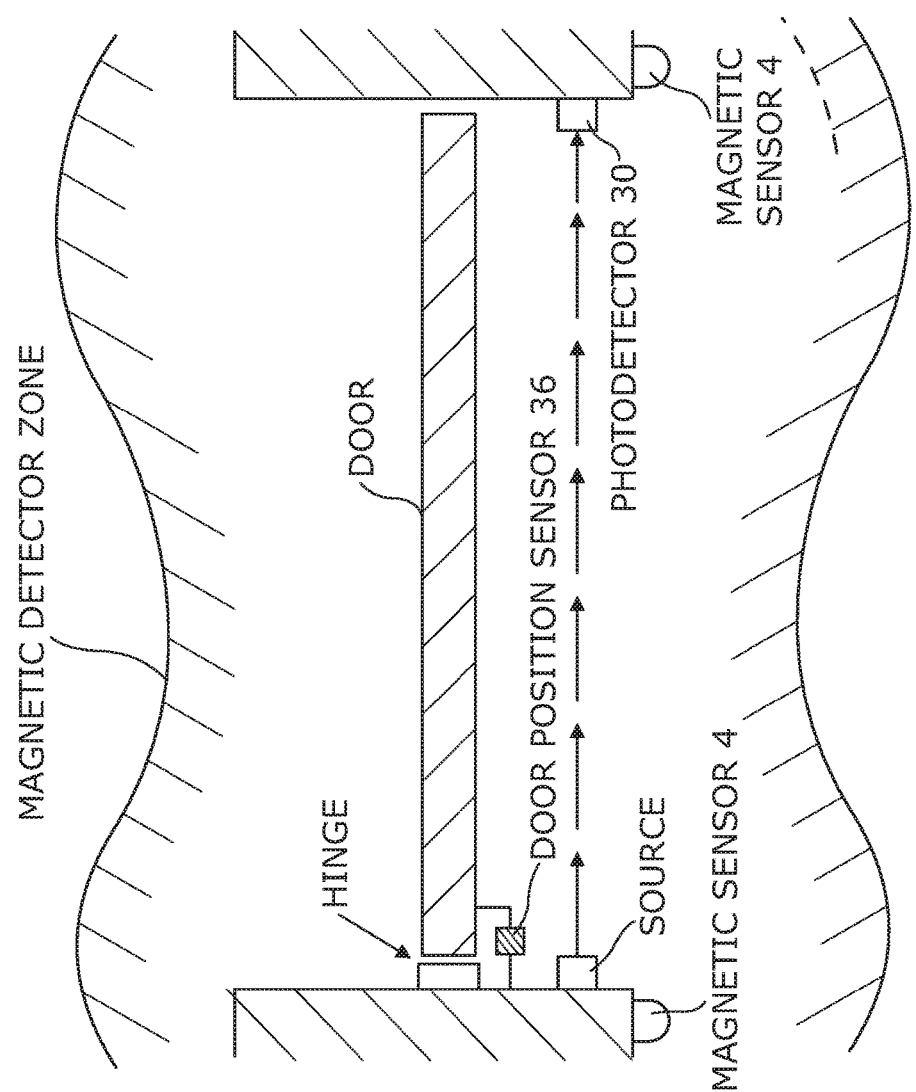
FIG. 7 is a view from above showing the location of the sensors and a stylised representation of the associated zones of detection for the embodiment of FIG. 3.

In addition, a door position sensor 36 is provided in this embodiment which produces an output signal indicative of the angular position of the door. The location of the door sensor is shown in FIG. 7 of the drawings. The output of this sensor 36 is fed into a signal processing circuit, such as that shown in FIG. 10, which processes the signal to determine the position of the door at a given time and also whether the door is moving or stationary. In this example it does so by comparing the position at the given moment in time with the position shortly prior to this. Feeding the door position signal into a first in last out (FILO) buffer in memory provides enough information to achieve this.

The signal processing circuit generates a door moving signal with a logical high value if the door is moving and logical low value if it is still. This is then combined with the output of the latch using a logical AND gate to provide a signal that is fed to the alarm device. The alarm is therefore raised if the latch output is high, indicating that a ferromagnetic object has broken the beam of the photoelectric sensor, but is suppressed if the door is moving.

Suppressing the alarm if the door is moving allows the apparatus to be used with ferromagnetic doors which might otherwise cause false alarms as they move.

Figure 11:
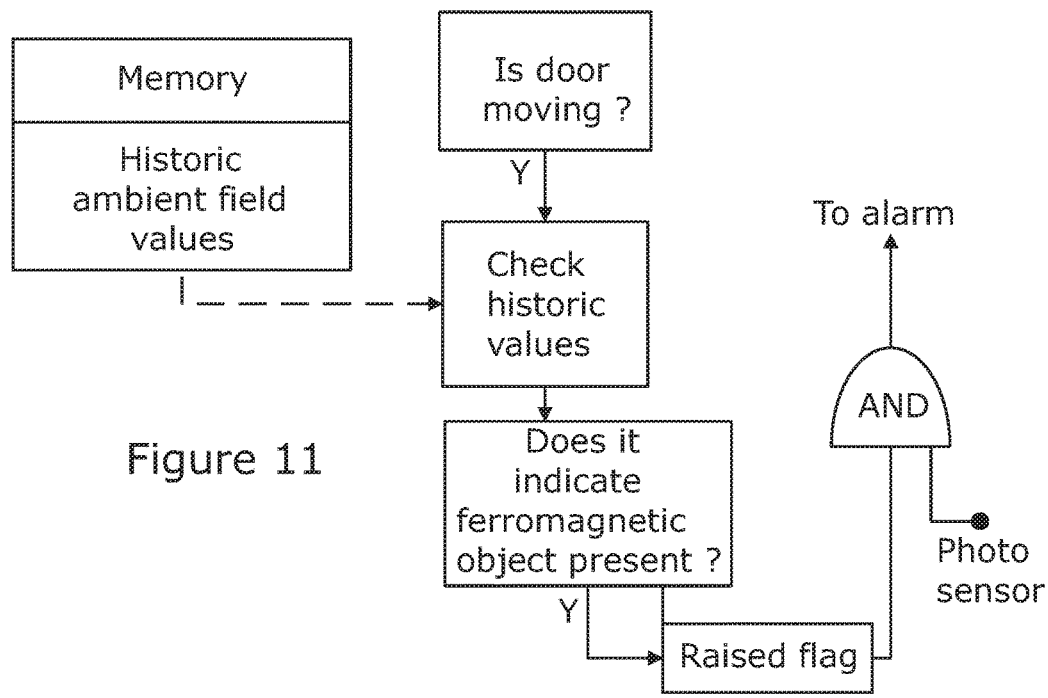
FIG. 11 is an illustration of the logic used within the signal processing circuit of a modified form of the third embodiment of FIG. 3.

In a modification, shown in FIG. 11, the apparatus includes an additional memory which stores historical ambient magnetic field information from the magnetic sensor. The signal processing circuit, shown schematically in FIG. 11, upon the door moving signal going high to indicate that the door has started to move, stops using the output of the magnetic field sensor for the current time as the basis for detecting the presence of a ferromagnetic object moving in the zone of sensitivity and instead looks at historical values stored in the memory prior to the door moving signal going high. If this provides an indication that a ferromagnetic object was moving in the zone of sensitivity just before the door moved, the circuit will then override the logical high value of the door moving signal so that the alarm is no longer suppressed, the alarm instead being raised.

By looking at the historical data, the alarm can remain active but effect of the moving door on the operation of the alarm is removed because the apparatus relies instead on the information obtained prior to the door moving.

Figure 12:
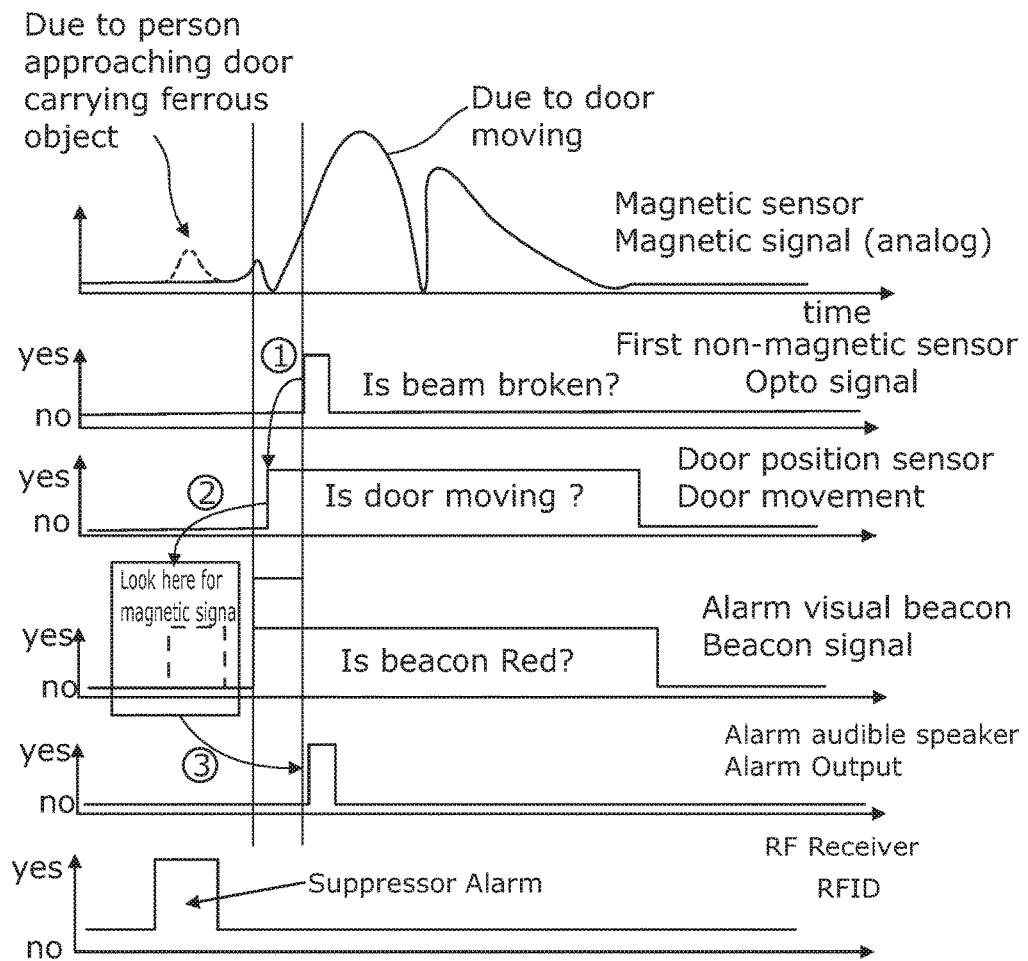
FIG. 12 is a set of plots of signal against time for the different sensors of the apparatus of FIG. 2 showing how historic signal information is used in the event that the door is moving to determine whether an object is approaching the protected area.

FIG. 12 illustrates the signals from the magnetic sensor, the optical beam, the door position sensor and the RF receiver when a ferromagnetic object approaches a door that then starts to move, as would be the case where a person carrying the object approaches the door and then pushes it open.

As can be seen, when the signal processing circuit detects that the door is moving it looks back in time at the magnetic signal before the door started to move. If this indicates that a ferromagnetic object was moving in the detection zone of the magnetic sensor as shown the alarm condition is raised.

The RFID tag condition is then checked to see if the alarm should be suppressed. If there is a known RFID tag detected it may suppress the alarm or modify it according to information held about the RFID tag.

The skilled person will understand that any of the features of these embodiments can be introduced into any other embodiment. For instance, the door moving suppression can be implemented in conjunction with the second optical beam to suppress the alarm as an object leaves a room.

It should also be understood that the simplified discrete logic circuits that have been illustrated are not to be construed as limiting. An almost limitless set of possible digital circuits could be readily implemented that achieve the same overall logical function, using combination of OR, AND, NOR, NAND and XOR gates, either as discrete elements or as logical steps in a computer implemented program executed on digital processing device.

The invention claimed is:

1. An MRI room protection apparatus configured to protect an entrance to an MRI room, the apparatus comprising:
   a magnetic sensor apparatus adapted to measure an ambient magnetic field or gradient within a localised volume of space defined by a first zone of sensitivity of at least one magnetic sensor, and to produce a corresponding measurement signal,
   a non-magnetic sensor means adapted to detect the presence of objects within a primary detection zone in the vicinity of the magnetic sensor apparatus,
   a signal processing circuit arranged in communication with the magnetic sensor apparatus and non-magnetic sensor means, and
   a warning device operable by an output signal from the signal processing circuit, the warning device adapted to provide within the vicinity of the magnetic sensor apparatus at least one of an audible alarm and a visible alarm,
   and further in which:
   the signal processing circuit is configured to identify temporal variations in the measurement signal due to the movement of a ferromagnetic object within the ambient magnetic field and to correlate the identified temporal variations in the measurement signal with instances in which the non-magnetic sensor means detects the presence of an object in its detection zone, and in which the signal processing circuit is arranged to cause the alarm to operate in the event that the correlation is indicative of the presence of a ferromagnetic object in the primary detection zone,
   and further in which the signal processing circuit is adapted to determine the direction from which an object is approaching the entrance from the output signals from the non-magnetic sensor means and to modify the operation of the warning device dependent on the direction of approach,
   wherein the non-magnetic sensor means comprises a first non-magnetic sensor adapted to detect the presence of objects within the primary detection zone and a second non-magnetic sensor adapted to detect the presence of objects within a second detection zone,
   wherein the first non-magnetic sensor and the second non-magnetic sensor each comprise an optical sensor and a light beam, the light beam extending across a region of space that defines the respective primary detection zone and second detection zone,
   wherein the apparatus is fitted to a doorway, the non-magnetic sensor means being located in or adjacent to the doorway, and wherein the non-magnetic sensor means is configured to detect an object at a time when the object is passing through the doorway, wherein the object traverses the doorway in a time of up to 3 seconds.

2. The MRI room protection apparatus according to claim 1 in which the non-magnetic sensor means is arranged so that an object approaching the entrance from within the MRI room enters the second zone of detection before the first, primary, detection zone.

3. The MRI room protection apparatus according to claim 1 in which the second non-magnetic sensor in a position of use is arranged to detect an object approaching the entrance from within the MRI room prior to the object being detected by the first non-magnetic sensor so that the alarm is suppressed whenever an object approaches the entrance from within the MRI room.

4. The MRI room protection apparatus according to claim 1 in which the second non-magnetic sensor has a zone of detection that is at least partially different to that of the first non-magnetic sensor and the signal processing circuit in use is adapted to determine that the object has approached from one direction if the object has entered the second detection zone before it enters the first detection zone and has approached from a different direction if it enters the first zone of detection before the second zone.

5. The MRI room protection apparatus according to claim 1 which is adapted to suppress the alarm for a defined period of time sufficient to allow a person to move through the entrance entering and then leaving the detection zone of the magnetic sensor apparatus.

6. The MRI room protection apparatus according to claim 1, wherein the second detection zone is defined within the MRI room by shining the light beam from a position outside of the entrance to a retroreflector within the MRI room, which reflects the light beam to the optical sensor, which is located outside of the entrance, the light beam being orientated such that it connects the optical sensor and retroreflector whenever a door is open and spans the width of the entrance.

7. The MRI room protection apparatus according to claim 1, wherein the first non-magnetic sensor and the second non-magnetic sensor further comprise a respective light source, each light source producing the respective beam of light, which impinges on its respective optical sensor, an output of each optical sensor changing state when its respective light beam is broken.

8. The MRI room protection apparatus according to claim 7, wherein the optical sensors and light beams are located on or within a rotatable housing or turret secured to a body of the apparatus, enabling an orientation of the light beams to be easily adjusted.

9. The MRI room protection apparatus according to claim 8, wherein the rotatable housing comprises a pod secured to a top or bottom of a larger housing, which accommodates other parts of the apparatus.

10. The MRI room protection apparatus according to claim 8, wherein the rotatable housing is rotatable in one plane or in two planes.

11. The MRI room protection apparatus according to claim 1, wherein light beams are aligned so that they do not overlap spatially.

12. The MRI room protection apparatus according to claim 1, wherein the light beams overlap spatially in a region that lies outside of the primary detection zone and secondary detection zone.

13. The MRI room protection apparatus according to claim 1, wherein the first and second non-magnetic sensors are positioned one to two feet off the ground.

14. The MRI room protection apparatus according to claim 1, wherein the first and second non-magnetic sensors are spaced apart in a parallel relationship.

15. The MRI room protection apparatus according to claim 1, wherein the object traverses the doorway in a time from 0.3 to 3 seconds.

16. An MRI room protection apparatus configured to protect an entrance to an MRI room, the apparatus comprising:
  a magnetic sensor apparatus adapted to measure an ambient magnetic field or gradient within a localised volume of space defined by a first zone of sensitivity of at least one magnetic sensor, and to produce a corresponding measurement signal,
  a non-magnetic sensor means adapted to detect the presence of objects within a primary detection zone in the vicinity of the magnetic sensor apparatus,
  a signal processing circuit arranged in communication with the magnetic sensor apparatus and non-magnetic sensor means, and
  a warning device operable by an output signal from the signal processing circuit, the warning device adapted to provide within the vicinity of the magnetic sensor apparatus at least one of an audible alarm and a visible alarm,
  and further in which the signal processing circuit is configured to identify temporal variations in the measurement signal due to the movement of a ferromagnetic object within the ambient magnetic field and to correlate the identified temporal variations in the measurement signal with instances in which the non-magnetic sensor means detects the presence of an object in its detection zone, and in which the signal processing circuit is arranged to cause the alarm to operate in the event that the correlation is indicative of the presence of a ferromagnetic object in the primary detection zone,
  and further in which the signal processing circuit is adapted to determine the direction from which an object is approaching the entrance from the output signals from the non-magnetic sensor means and to modify the operation of the warning device dependent on the direction of approach,
  wherein the non-magnetic sensor means comprises a first non-magnetic sensor adapted to detect the presence of objects within a primary detection zone and a second non-magnetic sensor adapted to detect the presence of objects within a second detection zone,
  wherein the first non-magnetic sensor and the second non-magnetic sensor each comprise an optical sensor and a light beam, the light beam extending across a region of space that defines the respective primary detection zone and second detection zone,
  the apparatus being adapted to suppress the alarm for a defined period of time sufficient to allow a person to move through the entrance, entering and then leaving the detection zone of the magnetic sensor apparatus, and
  wherein the non-magnetic sensor means is configured to detect an object at a time when the object is passing through the entrance, wherein the object traverses the entrance in a time of up to 3 seconds.

17. The MRI room protection apparatus according to claim 16, wherein the first and second non-magnetic sensors are positioned one to two feet off the ground.

18. The MRI room protection apparatus according to claim 16, wherein the first and second non-magnetic sensors are spaced apart in a parallel relationship.

19. The MRI room protection apparatus according to claim 16, wherein the object traverses the entrance in a time from 0.3 to 3 seconds.

* * * * *